(12) United States Patent
Nauka et al.

(10) Patent No.: US 10,850,450 B2
(45) Date of Patent: Dec. 1, 2020

(54) MODIFYING A BASE LAYER OF AN OBJECT

(71) Applicant: HEWLETT-PACKARD DEVELOPMENT COMPANY, L.P., Houston, TX (US)

(72) Inventors: Krzysztof Nauka, Palo Alto, CA (US); Sivapackia Ganapathiappan, Los Altos, CA (US); Hou T. Ng, Campbell, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 845 days.

(21) Appl. No.: 14/893,477

(22) PCT Filed: May 31, 2013

(86) PCT No.: PCT/US2013/043581
§ 371 (c)(1),
(2) Date: Nov. 23, 2015

(87) PCT Pub. No.: WO2014/193406
PCT Pub. Date: Dec. 4, 2014

(65) Prior Publication Data
US 2016/0121548 A1    May 5, 2016

(51) Int. Cl.
| | | |
|---|---|---|
| *B29C 64/386* | (2017.01) | |
| *B29C 64/40* | (2017.01) | |
| *G06T 19/20* | (2011.01) | |
| *B29C 64/393* | (2017.01) | |
| *B29C 67/00* | (2017.01) | |
| *B33Y 50/00* | (2015.01) | |
| *B33Y 10/00* | (2015.01) | |

(Continued)

(52) U.S. Cl.
CPC .......... *B29C 64/386* (2017.08); *B29C 64/393* (2017.08); *B29C 64/40* (2017.08); *B29C 67/0088* (2013.01); *G06T 19/20* (2013.01); *B33Y 10/00* (2014.12); *B33Y 30/00* (2014.12); *B33Y 50/02* (2014.12)

(58) Field of Classification Search
CPC ..... B33Y 50/02; B29C 64/386; B29C 64/396; B29C 64/40; B29C 64/393; G06T 19/20
See application file for complete search history.

(56) References Cited

U.S. PATENT DOCUMENTS 4,999,143 A * 3/1991 Hull ........................ B29C 41/12
156/273.3
5,216,616 A    6/1993 Masters
(Continued)

FOREIGN PATENT DOCUMENTS

CN    101642809    2/2010
CN    102026797    4/2011
(Continued)

OTHER PUBLICATIONS

Stava, O. et al.; "Stress Relief: Improving Structural Strength of 3D Printable Objects"; May 9, 2012; http://hpcg.purdue.edu/pubs/2012/Stava2012sigg.pdf.

*Primary Examiner* — Atul P. Khare
(74) *Attorney, Agent, or Firm* — HP Inc. Patent Department (57) ABSTRACT

A printed object includes a modification not present in the original model of the object. The modification is included in a base layer of the object.

19 Claims, 9 Drawing Sheets

(51) Int. Cl.
  *B33Y 30/00* (2015.01)
  *B33Y 50/02* (2015.01)

(56) References Cited

U.S. PATENT DOCUMENTS

| | | | | |
|---|---|---|---|---|
| 5,303,141 | A * | 4/1994 | Batchelder | B29C 41/36 |
| | | | | 700/29 |
| 5,555,481 | A * | 9/1996 | Rock | B22F 3/008 |
| | | | | 419/30 |
| 5,695,707 | A * | 12/1997 | Almquist | B29C 41/12 |
| | | | | 264/401 |
| 5,858,297 | A | 1/1999 | Ozawa et al. | |
| 6,175,422 | B1 * | 1/2001 | Penn | B33Y 50/00 |
| | | | | 358/1.1 |
| 6,569,373 | B2 * | 5/2003 | Napadensky | B41M 3/006 |
| | | | | 264/401 |
| 6,658,314 | B1 * | 12/2003 | Gothait | B33Y 70/00 |
| | | | | 700/119 |
| 6,948,940 | B2 * | 9/2005 | Lindsey | G01R 1/06733 |
| | | | | 257/E23.068 |
| 7,364,686 | B2 * | 4/2008 | Kritchman | B29C 70/68 |
| | | | | 264/494 |
| 8,983,643 | B2 * | 3/2015 | Heide | B29C 67/0092 |
| | | | | 700/98 |
| 9,308,690 | B2 * | 4/2016 | Boyer | B33Y 10/00 |
| 9,582,933 | B1 * | 2/2017 | Mosterman | G06T 17/10 |
| 9,707,719 | B2 * | 7/2017 | Kroner | H04N 1/00827 |
| 2002/0171178 | A1 | 11/2002 | Dean et al. | |
| 2008/0121172 | A1 | 5/2008 | Kritchman et al. | |
| 2009/0174709 | A1 * | 7/2009 | Kozlak | G06F 17/50 |
| | | | | 345/420 |
| 2010/0140849 | A1 | 6/2010 | Comb et al. | |
| 2010/0191360 | A1 * | 7/2010 | Napadensky | G06T 17/00 |
| | | | | 700/98 |
| 2011/0087350 | A1 | 4/2011 | Fogel et al. | |
| 2011/0178621 | A1 | 7/2011 | Heide | |
| 2011/0304074 | A1 | 12/2011 | Wang et al. | |
| 2012/0251689 | A1 | 10/2012 | Batchelder | |
| 2012/0261267 | A1 | 10/2012 | Smalley | |
| 2012/0287473 | A1 | 11/2012 | Pettis | |
| 2012/0308837 | A1 | 12/2012 | Schlechtriemen et al. | |
| 2014/0039659 | A1 * | 2/2014 | Boyer | B33Y 10/00 |
| | | | | 700/98 |
| 2014/0129020 | A1 * | 5/2014 | Kroner | H04N 1/00827 |
| | | | | 700/118 |
| 2017/0052531 | A1 * | 2/2017 | Minardi | G05B 15/02 |

FOREIGN PATENT DOCUMENTS

| | | |
|---|---|---|
| DE | 102010024226 | 12/2011 |
| WO | WO-02085246 A2 | 10/2002 |
| WO | WO-2013013146 | 1/2013 |
| WO | WO-2013013146 A1 | 1/2013 |

* cited by examiner

MODIFYING A BASE LAYER OF AN OBJECT

BACKGROUND

Objects can be created in three dimensions by printing and stacking cross-sectional portions of the object.

In one method, an object is printed directly by dispensing layers of molten material that hardens soon after it is dispensed. An example of such method is Fused Deposition Modeling.

Another method involves shaping an object layer by layer in powder or liquid carrier material. For example, a layer of powder is deposited and selected portions thereof are fused. This process is repeated layer-by-layer to build a solid object within the powder or granulate. Similarly, adhesive can be dispensed onto layers of powder, thereby binding subsequent layer portions to form the object within the powder. For example, a support platen that supports the object and carrier medium can move with respect to a laser, fuser or dispenser step-by-step to allow layer by layer building. Alternatively or in addition, the laser, fuser or dispenser can move with respect to the platen.

In another similar method, layers of the object are solidified in a carrier liquid, wherein each solidified layer builds onto a previously solidified portion. For example, a platen to support the object can move downwards step-by-step in a liquid container to allow new layers of the object to be solidified. Thermal radiation or light can be emitted to facilitate fusing, binding and/or solidification of selected regions of the carrier medium.

Some of these three dimensional printing methods can be known as stereo-lithography, powder bed three dimensional printing, inkjet head three dimensional printing, solid freeform fabrication, additive manufacturing, solid free form fabrication, sintering, etc.

BRIEF DESCRIPTION OF THE DRAWINGS

For the purpose of illustration, certain examples constructed in accordance with this disclosure will now be described with reference to the accompanying drawings, in which.

DETAILED DESCRIPTION

In the following detailed description, reference is made to the accompanying drawings. The examples in the description and drawings should be considered illustrative and are not intended as limiting to the specific example or element described. Multiple examples can be derived from the following description and drawings through modification, combination or variation of certain elements.

Figure 1:
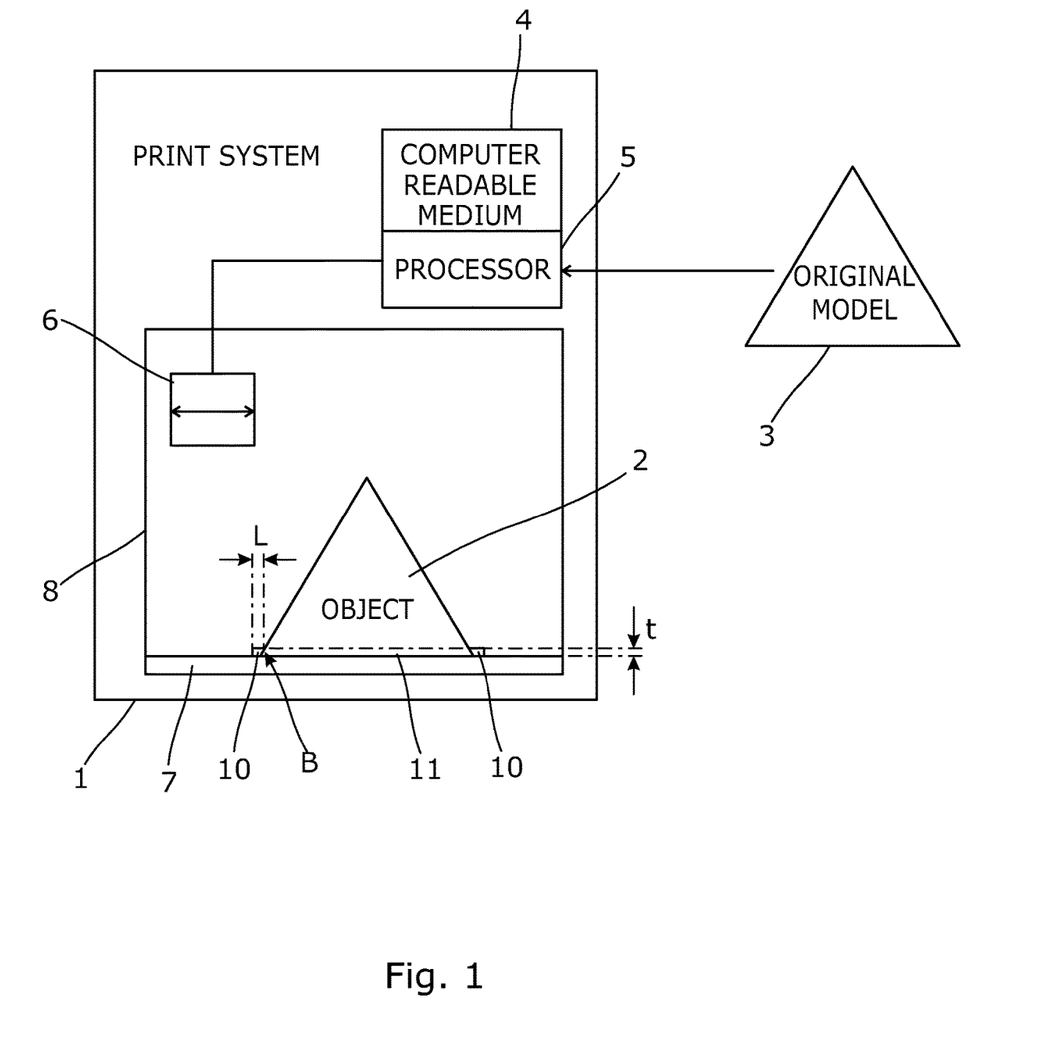
FIG. 1 illustrates a diagram of an example of a three dimensional print system, including an original model and a printed object.

FIG. 1 illustrates an example print system 1. The print system 1 is a three-dimensional print system to print three dimensional objects 2. For example, the print system 1 is to print three dimensional objects 2 according to at least one of fused deposition modeling, stereo-lithography, powder bed printing or sintering, inkjet head three dimensional printing, solid freeform fabrication, additive manufacturing, solid free form fabrication, sintering, or any other form of three dimensional printing or dispensing. It is noted that in this disclosure the terms printing and print system 1 or the like should be interpreted broadly. In this disclosure, printing can also be understood as "creating" or "building". In this disclosure, a print system can be any creation or build device that builds objects layer-by-layer on the basis of image data.

FIG. 1 illustrates an example object 2 that is printed by the print system 1, based on an original model 3. The print system 1 includes a formation device 6, such as a dispenser and/or a thermal and/or light emitter, for producing the object 2.

For example, the print system 1 includes a fixed or replaceable computer readable medium 4. For example, the computer readable medium 4 is to store, at least temporarily, image data corresponding to the model 3, for example three-dimensional image data or a collection of two-dimensional image data corresponding to layers. For example, the print system 1 includes a processor 5 to process this image data and to control the printing system to print the object 2. For example, the processor 5 is to instruct the formation device 6 to build an object 2 layer-by-layer based on the original model as stored on the computer readable medium 4. For example, the processor 5 and computer readable medium 4 are part of a print system controller or ASIC (Application Specific Integrated Circuit). For example, the computer readable medium 4 includes a print system profile or driver for instructing the formation device 6 based on image data.

For example, the print system 1 includes a platen 7 to support the object 2 and/or carrier medium such as liquid or powder. In the example wherein the print system 1 forms an object 2 in carrier medium, a set of walls or a container 8 can be provided around the platen 7. The platen 7 can be an integral part of the container 8. In another example, walls are printed around the object 2 in each print job. A carrier medium dispenser (not shown) for depositing layers of carrier medium can be provided in the print system, for example to dispense a layer of powder each time after a layer of the object 2 has been bound, fused and/or solidified.

In another example, the formation device 6 is to print the object 2 directly, for example by dispensing molten material, for example layer upon layer, without the use of a carrier medium dispenser. In another example, liquid carrier medium is used wherein the object is solidified layer upon layer at the surface of the liquid, and built up by a downwards stepping movement of the platen with respect to the liquid surface.

For example, the platen 7 is moveable, for example in a vertical direction. For example, the platen 7 is to move with respect to the formation device 6, to allow layer-by-layer solidification. In another example, the formation device 6 is to move with respect to the platen 7 and/or both the formation device 6 and the platen 7 are to move.

In certain examples, the print system 1 does not include a platen 7 or container 8. For example, the print system 1 is to print on another surface that need not be an integral part of the print system 1.

In one example, the formation device 6 dispenses energy or material layer by layer, to build, bind or solidify the object 2 layer after layer. In one example, the formation device 6 dispenses molten or softened material. In one example, the formation device 6 dispenses adhesive or reactive material to selectively fuse, bind or solidify a carrier medium. In one example, the formation device 6 emits heat or light or other suitable electro-magnetic signals within pre-selected wavelength ranges, to selectively fuse, bind and/or solidify carrier medium and/or molten material. In one example, the formation device is to solidify a liquid/powder by thermally exposing or photo-polymerizing a selected region. In one example, the formation device 6 includes a laser or the like. In yet another example the formation device 6 emits sound waves to fuse carrier medium, for example by stereolithography. In one example the formation device 6 is movable in horizontal and/or vertical directions when dispensing or emitting material or energy, respectively, in certain instances instead of or complementary to a moving platen 7. In one example, the formation device 6 is capable to dispense or emit over an entire width of the platen 7 to scan in one direction, or the formation device 6 is to scan in X and Y directions, wherein the X- and Y-axis are parallel to the platen 7. In another example the formation device 6 spans over the entire platen 7 in both X and Y direction. In certain examples, the formation device 6 includes several sub-devices, for example a dispenser for dispensing material and an emitter for emitting electro-magnetic waves or sound or heat waves.

For example, the original model 3 represents an originally intended design to be produced as a printed object 2. For example, the original model 3 can be a tangible model, or can be a virtual original model in the form of digital image data. In this disclosure, "virtual" can be interpreted as "digital". For example the original model 3 is to be presented or through a display, to allow an end user or operator to choose such original model for printing. In one example, the original model is presented through a third party website or application. In one example the original model 3 includes three dimensional image data and/or can include a collection of two dimensional images to construe a three dimensional object layer by layer. In one example the original model 3 is communicated to the print system 1 in the form of digital data, for example in a file format suitable for processing, conversion and/or printing by the print system 1. In one example, the original model 3 is stored on a computer readable medium 4, such as a fixed or replaceable non-transitory non-volatile digital storage arrangement that in certain instances can be part of the print system 1. In other instances, the computer readable medium 4 is a mobile non-volatile memory or is part of a distant computing device such as a server, a database, etc. In one example, the original model 3 is presented by and/or downloadable from such distant computing device, for example through a third party website or application.

In another example, the original model 3 is a physically tangible model. For example, such tangible original model can be scanned by a scanning device during printing. For example, the scanned data is sent to the print system 1. For example, the scanned data is to be converted to computer readable data for printing by the print system 1 in real-time.

In this disclosure, the object 2 represents a printed version of the original model 3 or a pre-processed virtual (digital) version of the model 3. The object 2 includes a modification 10 with respect to the original model 3, wherein the modification 10 is provided in a base layer 11 of the object 2. In one example, the modification 10 includes a protrusion. The modification 10 is not present in the original model 3. In one example, the base layer 11 is modified to propagate stresses in the relatively thin base layer 11, to prevent deformation in the initial stages of printing. For example, modifications other than protrusions can be cut outs or design changes that likewise are to counter stresses in the base layer 11.

Figure 2:
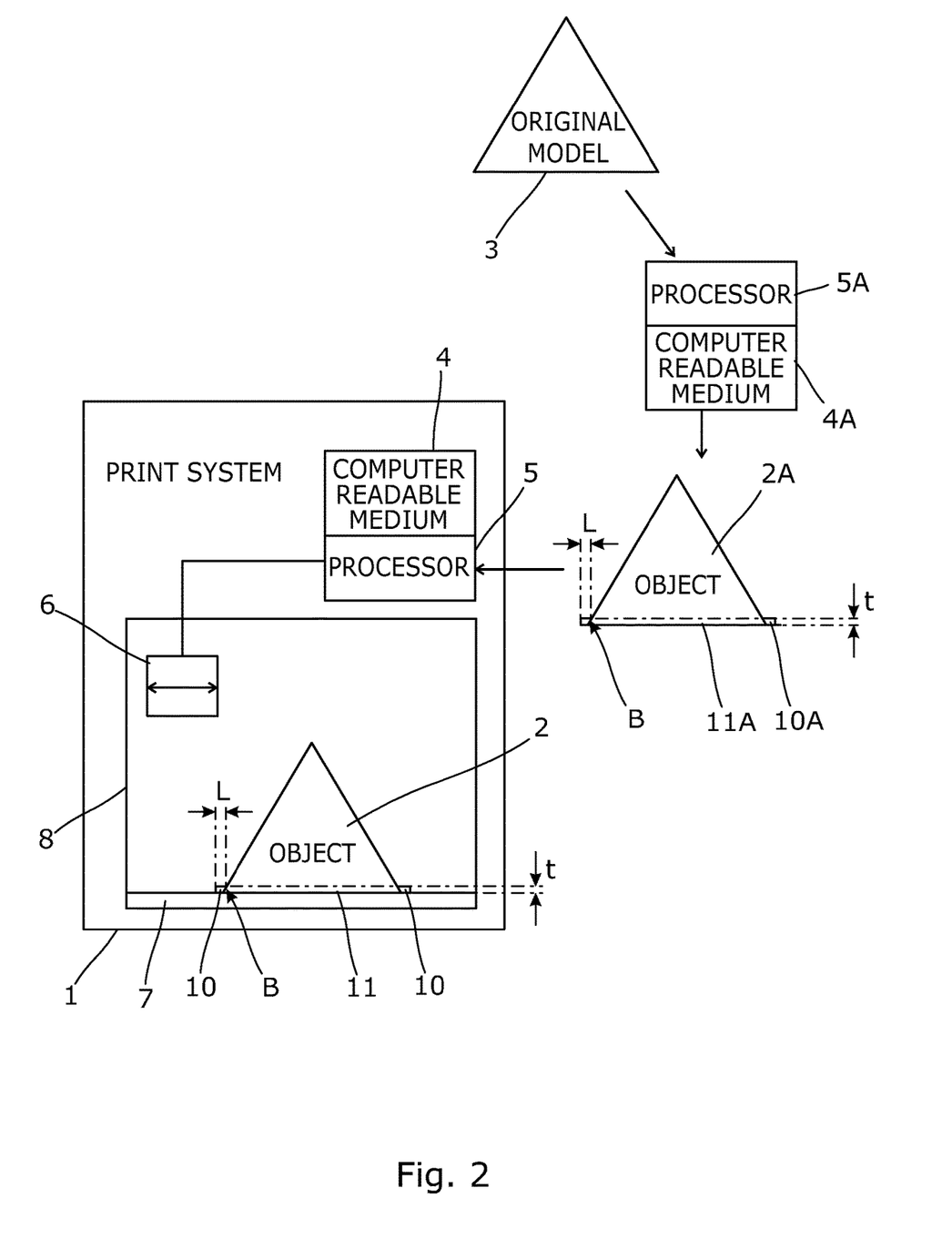
FIG. 2 illustrates a diagram of an example of a three dimensional print system, including an original model, a virtual object and a printed object.

FIG. 2 illustrates a similar print system 1 as FIG. 1 with similar features. FIG. 2 illustrates that the object 2A that is modified for printing can be a virtual object 2A for printing in the form of data, wherein the virtual object 2A includes virtual modifications 10A not present in the original model 3. In one example, the virtual modification 10A is a virtual protrusion. The virtual modifications 10A are added to a virtual base layer 11A so that a resulting object 2 is a direct physical representation of the virtual object 2A. For example, the virtual object 2A can be processed by the printer 1 without further modifications. For example, the virtual modification 10A is added by a processor 5A external to the print system 1. For example, the virtual object 2A is stored on a distant computer readable medium 4A external to the print system. For example, the virtual object 2A is stored on a server, database or a mobile non-volatile memory such as a USB stick or flash card, etc. For example, the virtual object 2A is downloadable from a website, database, server or suitable application, for example after selecting the original model 3. In this disclosure, the object 2, 2A, modification 10, 10A and base layer 11, 11A refer to both physical and virtual (digital) instances unless mentioned otherwise.

Figure 3:
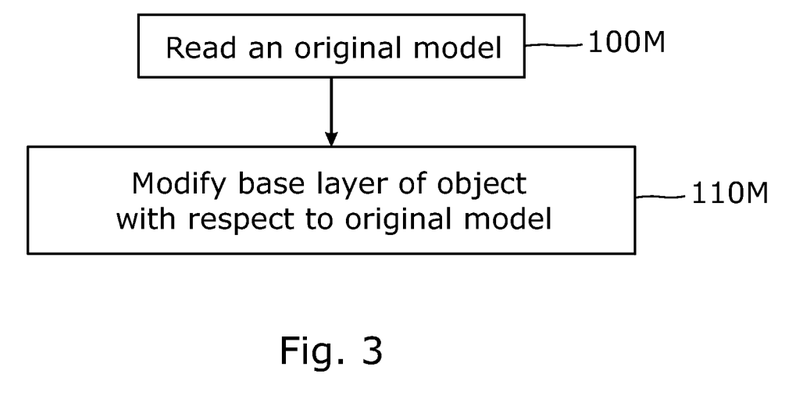
FIG. 3 illustrates a flow chart of an example of a method of preparing an object for printing.

FIG. 3 illustrates a flow chart of an example method of preparing an object 2, 2A for printing that includes reading an original model 3 (block 100M), for example with a processor 5, 5A. The method further includes, for example with the processor 5, 5A, modifying a base layer 11, 11A of a corresponding object 2, 2A with respect to the original model 3 (block 110M). The computer readable medium 4, 4A can include instructions that, when executed, cause the processor 5, 5A to read the original model 3, and to modify the base layer 11, 11A with respect to the original model 3. In turn, the processor 5 can instruct the formation device 6 to print the object 2 including the modification 10.

The base layer 11 can be defined as a collection of first printed layers up to a relatively small thickness t, that is, a thickness rigid enough to suppress internal stress-induced deformation. Up to such thickness t, the base layer 11 is thin and hence relatively susceptible to deformation. The base layer 11 is defined by first printed layers and can be determined in a manner that is opportune for printing, regardless of what could be considered as a base, bottom, top, side, etc. of a resulting product. That is, products can be printed in any orientation; upside down, on the side, etc. In certain circumstances, deformations such as curling, shrinkage or expansion can occur during printing of first layers as a consequence of mechanical and thermal stresses for example caused by at least one of temperature changes, local temperature gradients, phase transitions (e.g. solidification), different thermal expansions of the carrier medium and the printed layers, chemical reactions, etc. If these first printed layers of a partially printed object 2 are deformed, even if only slightly, this may affect the rest of the object 2. As a consequence, subsequently printed layers may be displaced or broken. In another scenario, subsequent layers that are printed on top of the first layers could cause these first layers to be shifted, bent, broken or completely or partially deformed with respect to the subsequent layers. During printing of the first layers the process may be prone to aberrations, because the overall thickness of the three dimensional object 2 is still quite low.

In an example, an effect of adding modifications 10, 10A such as protrusions to the base layer 11, 11A is that deformations in the printed base layer 11 can be reduced. The modifications 10, 10A can be added by the print system processor 5 in real-time, or beforehand by an external processor 5A. By adding at least one modification 10 to the base layer 11, stresses may be distributed to regions in or around these modifications 10 or otherwise distributed over the base layer 11, so that a likelihood of deformation in the base layer 11 during printing can be reduced. In the example wherein the modifications include protrusions, stress can propagate to these protrusions so that only the protrusions are deformed.

For example the protrusions are relatively thin extensions having an elongate shape. In further examples the protrusions have a serpentine shape, a curled shape, or another suitable shape, for example to aid in stress release. For example a protrusion contains further sub-protrusions in the form of branches. For example the protrusions are at least partially defined by flange-type or ridge-like extensions or flaps. The protrusions can be sacrificial features, to be removed after printing. In other example the protrusions are not or hardly visible after printing and need not be removed, or are worn off automatically. In the illustrated example, the protrusions have a relatively thin, elongate, tubular or rectangular shape.

An original model 3 can include original protrusions in the base layer that are part of the originally intended design. These original protrusions are not to be confused with the modifications 10, 10A and added protrusions discussed in this disclosure.

For example the added protrusions and the base layer 11, 11A are relatively thin, for example up to a thickness that is rigid enough to prevent stress. For example the added protrusions and the base layer 11, 11A can be of a thickness t of approximately 500 micron or less, approximately 300 micron or less, or approximately 200 micron or less, for example as measured from a bottom surface of the object 2, 2A. For example the added protrusion and base layer 11, 11A can have a minimum thickness t of approximately 1, 10, 50 or 100 micron, or in certain instances less. In an example the base layer 11, 11A consists of a small number of first printed layers, such as for example one to five subsequent first printed layers, one to twenty subsequent first printed layers or one to hundred first printed layers. The number of layers of the base layer 11, 11A may depend on the thickness of each individual printed layer, which in turn may depend on settings or limitations of the print system 1 and/or the size of the object 2. In an example the print system 1 is to print individual layers having thickness of between approximately 0.5 and 1000 micron or 0.5 and 200 micron.

Illustrative example lengths L of protrusions can be in the order of several, tens or hundreds of microns, or several or tens of millimeters, for example depending on the volume, surface area and/or shape of the base layer 11, 11A. A length L of the protrusions can be defined as the length between the originally intended base layer outer border B up to an outer end of the protrusion.

Figure 4:
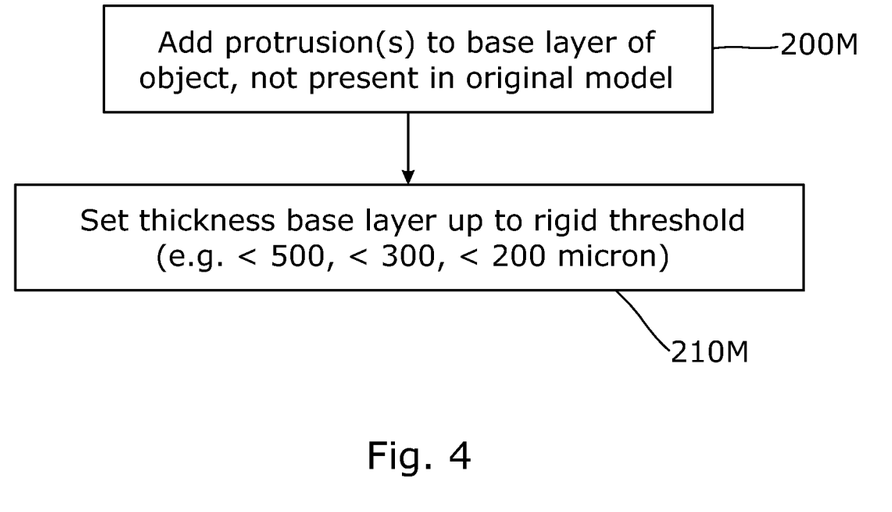
FIG. 4 illustrates a flow chart of another example of a method of preparing an object for printing.

For example the computer-readable medium 4, 4A stores a threshold that corresponds to a base layer thickness t rigid enough to suppress stress-induced deformation, wherein the instructions, when executed, cause the processor to set the thickness t of the base layer 11, 11A and the at least one protrusion no thicker than said threshold. In accordance with the earlier paragraph such threshold may be 500, 300 or 200 microns. Correspondingly, FIG. 4 illustrates a flow chart of another example method of preparing an object 2, 2A for printing, that includes adding at least one protrusion to a base layer 11, 11A of the object 2, 2A, wherein the protrusion is not present in the original model 3, 3A (block 200M). For example, the base layer 11, 11A and the protrusion have a thickness t up to a threshold rigid enough to suppress stress-induced deformation (block 210M).

Figure 5:
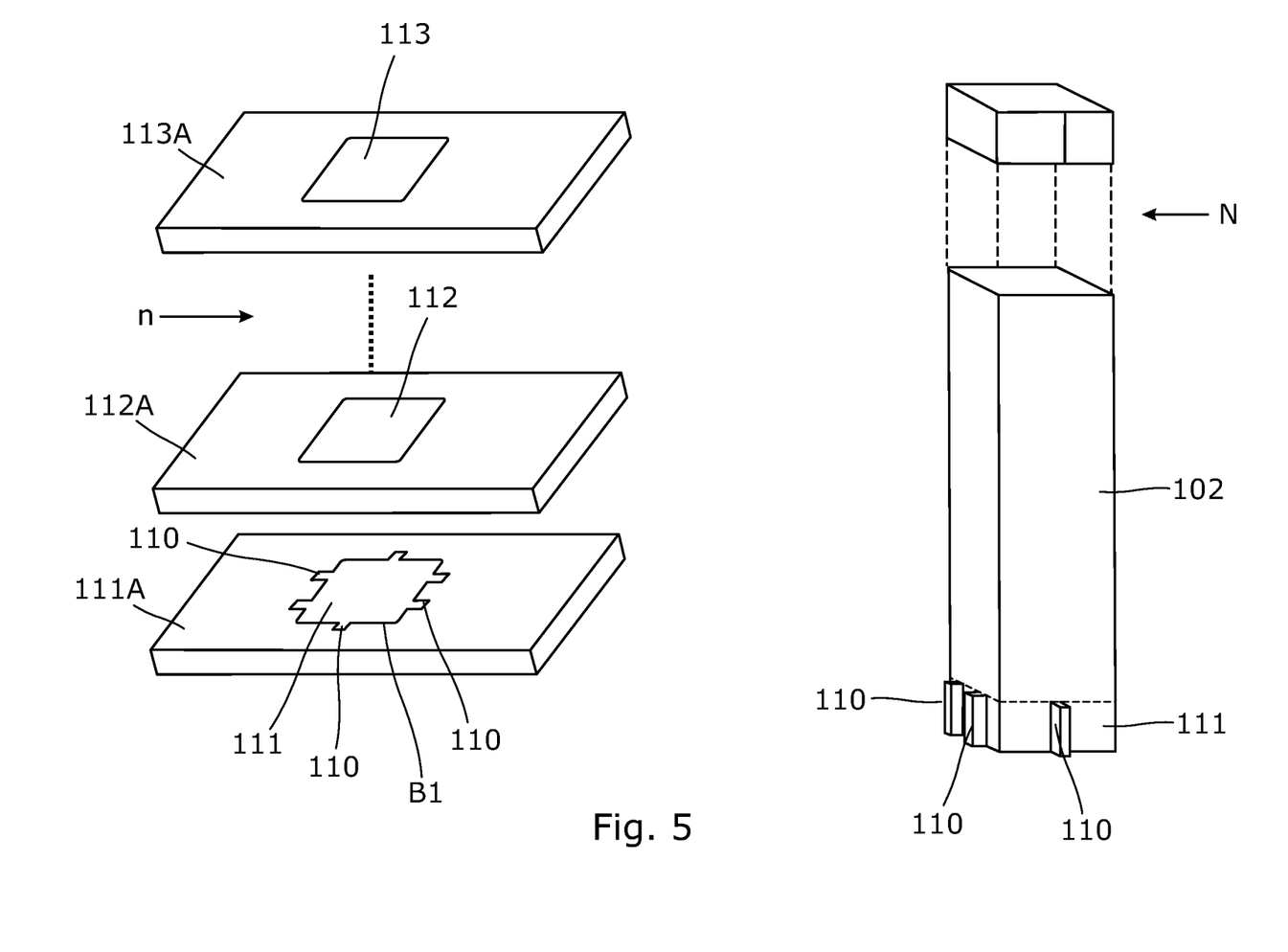
FIG. 5 illustrates a diagram of an example of how an object is printed layer by layer, and the resulting object.

FIG. 5 illustrates a diagram of an example of how to print an object 102 layer by layer. A left side of FIG. 5 illustrates examples of individual printed layers 111, 112, 113 of an object 102. The printed layers 111, 112, 113 represent fused, bound or solidified portions within larger layers 111A, 112A, 113A of carrier medium. In the illustrated example the base layer 111 includes one first printed layer. In the illustrated example a number of in-between carrier medium and printed layers n have been omitted for reasons of clarity. A right side of FIG. 5 illustrates an example of the resulting printed object 102 wherein a portion N of the object 102 has been omitted for reasons of clarity. As can be seen, the first printed base layer 111 includes protrusions 110 that extend horizontally. The illustrated protrusions 110 extend outwards and away from the intended base layer outer border B1. In another example the horizontal protrusions extend inwards, for example into a hollow portion of the object.

The horizontal protrusions 110 are not present in the original model 103 of the object 102. For example the horizontal protrusions 110 extend parallel to the platen (not shown). In a further example the protrusions 110 lie directly on the platen, during printing. For example the protrusions 111 are tentacle shaped. For example only the base layer 111 includes protrusions 110 that are not present in the original model 103 and the subsequently printed layers 112, 113 of the object 102 do not include such added protrusions 110.

Figure 6:
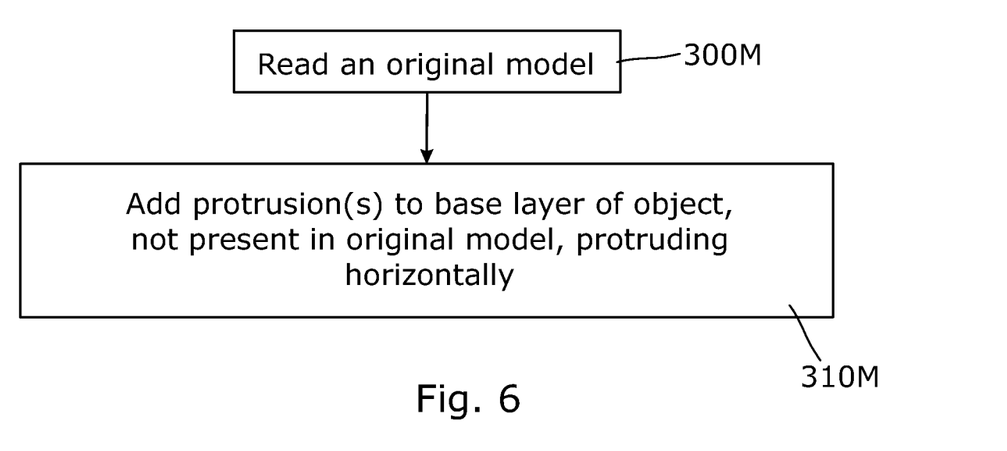
FIG. 6 illustrates a flow chart of an example of a method of preparing an object for printing related to FIG. 5.

FIG. 6 illustrates a flow chart of an example of a method of preparing an object 102 for printing that may apply to the examples of FIG. 5. The method includes reading an original model (block 300M), for example with a processor, and adding at least one protrusion in a base layer of the object, the protrusion not being present in the original model, and oriented in a horizontal direction, for example parallel to a print system platen (block 310M). For example, a computer-readable medium stores instructions that cause the processor to execute the example method of FIG. 6.

Figure 7:
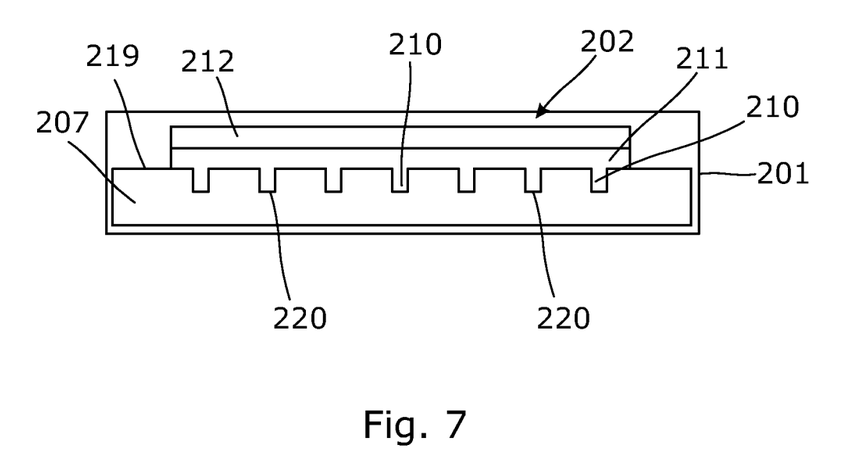
FIG. 7 illustrates a diagram of an example cross sectional side view of an object in a print system.

FIG. 7 illustrates a diagram of a printer 201 having an example platen 207 and object 202. The example platen 207 includes a flat support surface 219 and an array of holes 220 in the support surface 219. For example the array includes rows and columns of holes 220, or another holes pattern. These holes 220 can be relatively shallow. For example the holes 220 have a depth of approximately 200 micron or less, or approximately 300 micron or less, or approximately 600 micron or for example of 2 or 5 millimeters or less. For example the diameter of the holes 220 is approximately 500 micron or less, or approximately 2 millimeter or less, or approximately 5 millimeter or less. For example hole dimensions can depend on the typical size or maximum size of the objects that the printer can print. The holes 220 may have any suitable shape such as cubical, cylindrical or concave, for example with rounded or straight edges. For example the holes 220 are to anchor a base layer 211 of the to-be-printed object 202 to the platen 207.

In the shown diagram, a printed object 202 is supported by the platen 207. The object 202 includes at least a base layer 211 and at least one subsequent layer 212 on top of the base layer 211. The base layer 211 includes at least one first printed layer and protrusions 210 that are not present in the original model. The at least one subsequent layer 212 excludes such protrusions not present in the original model. For example the dimensions and shape of the protrusions 210 are the inverse of the holes 220. For example the protrusions 210 are automatically shaped by printing the first layer over the array of holes 220, so that the printed material or carrier medium automatically fills the holes 220, without special instructions. In other examples the protrusions 210 are the consequence of specific printer processor instructions.

Figure 8:
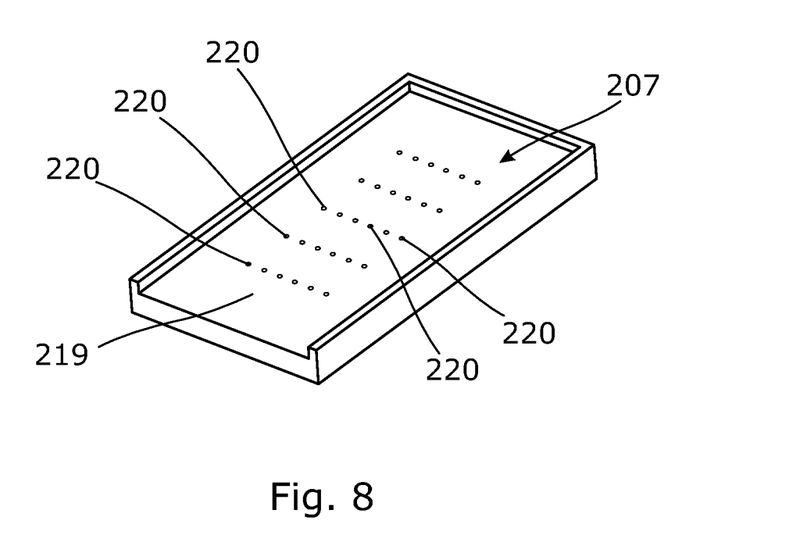
FIG. 8 illustrates a perspective view of an example of a platen related to FIG. 7.

FIG. 8 illustrates an example platen 207 for supporting the object 202, corresponding to the platen 207 of FIG. 7. The platen 207 can be an integral, fixed or replaceable part of a three-dimensional print system. In an example the platen 207 is to support carrier medium and/or the object 202. The example platen 207 includes a flat support surface 219. The holes 220 extend through the support surface 219.

Figure 9:
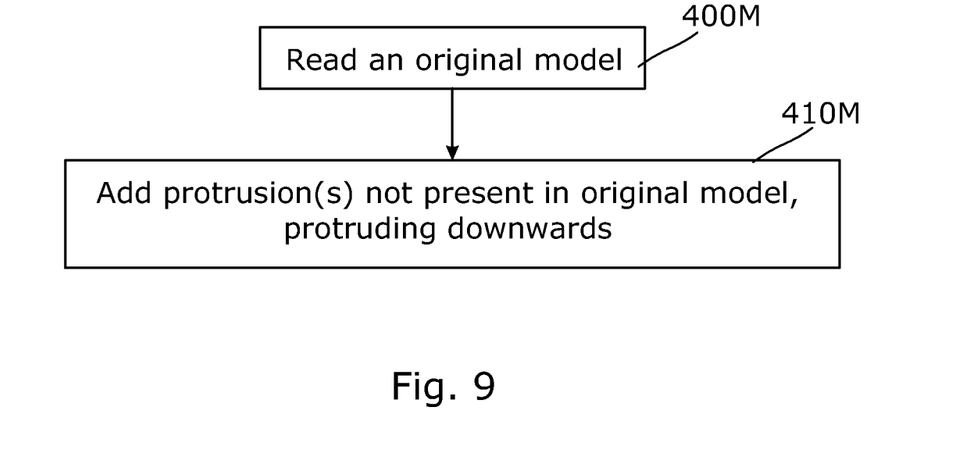
FIG. 9 illustrates a flow chart of an example of a method of preparing an object for printing, for example corresponding to the examples of FIGS. 7 and 8.

FIG. 9 illustrates a flow chart of an example method of printing, for example with the aid of features explained above with reference to FIGS. 7 and 8. The method includes, for example with a processor, reading an original model (block 400M), and adding at least one protrusion to the base layer that protrudes downwards (block 410M), for example to anchor the base layer 211 to a platen or to carrier medium below the object. For example the protrusions are to extend in holes of the platen. A computer-readable medium can include instructions that, when executed, cause a processor to perform this method.

In another example the printed object is not directly supported by the platen but rather "floats" in carrier medium, that is, at least one layer of carrier medium is disposed between the platen and the object. In such scenario the object may also contain protrusions, not present in the original model, that protrude downwards towards the platen. For example these protrusions protrude into the carrier medium. For example these protrusions may or may not contact the platen and the platen may or may not include the array of holes.

Figure 10A:
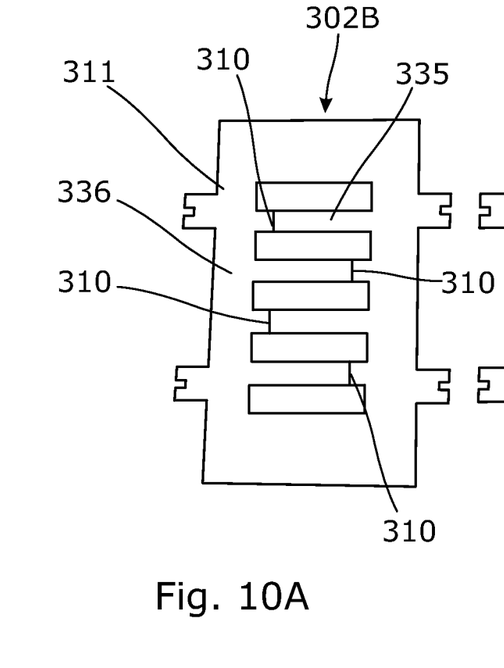
FIG. 10A illustrates an example of a base layer of an object.
Figure 10B:
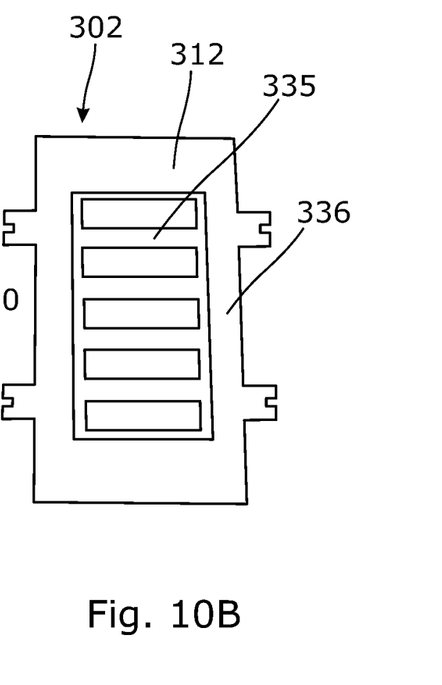
FIG. 10B illustrates an example of a resulting object that includes the base layer of FIG. 10A.

FIG. 10A illustrates an example of an intermediate printed object 302B. The intermediate object 302B consists of a base layer 311, which in turn consists of only first printed layers. The base layer 311 includes protrusions 310, not present in an original model of the object 302, that protrude upwards. For example, the protrusions 310 are to anchor the base layer 311 to at least one subsequently printed layer 312 printed over the base layer 311, the result of which can be the object 302 illustrated in FIG. 10B. In the illustrated example the protrusions 310 are in the form of ribs. In another example the protrusions are convex, tubular, pointy, or of any shape suitable for anchoring to the subsequent layer. For example the protrusions 310 are located in regions where the base layer 311 is likely to deform without such protrusions 311, for example where the base layer 311 covers relatively less surface area. In the illustrated example of FIG. 10A the protrusions 311 are present in relatively thin bridge-sections 335 that span between wider side sections 336 of the base layer 311. FIG. 10B illustrates the corresponding object 302 after the at least one subsequent layer 312 has been printed over the base layer 311 and protrusions 310, wherein the protrusions 310 are covered by the subsequent layer 312 and hence not visible.

Figure 11:
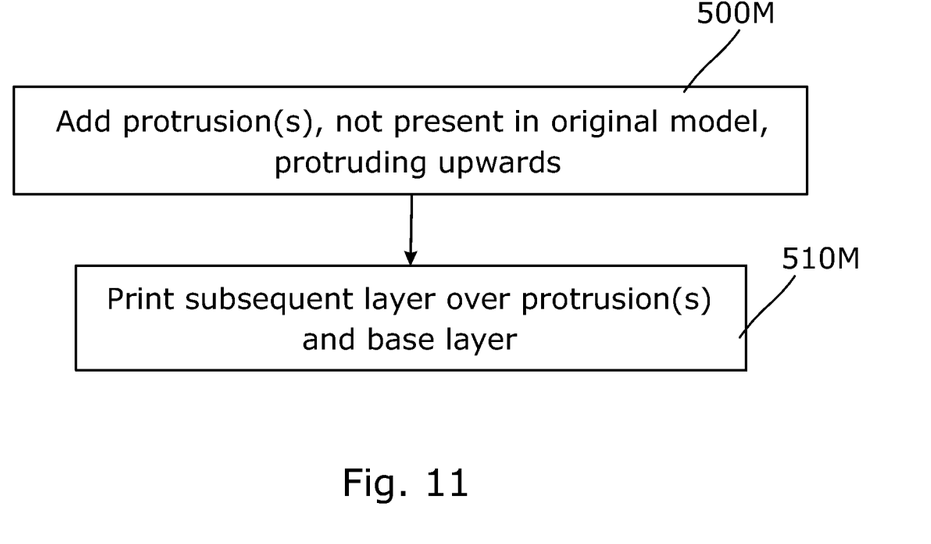
FIG. 11 illustrates a flow chart of an example of a method of preparing an object for printing, for example corresponding to FIGS. 10A and 10B.

FIG. 11 illustrates a flow chart of an example of a method of preparing an object for printing. For example the method includes adding protrusions to a base layer that are not present in the original model wherein the protrusions protrude upwards (block 500M), for example away from a platen. For example, the method further includes printing the base layer with protrusions and at least one subsequent layer over the base layer and the protrusion (block 510M). A computer-readable medium includes a set of instructions that when executed cause a processor to add protrusions to a base layer that are not present in the original model, so that the protrusions protrude upwards. For example the set of instructions, when executed, cause the print system to print the at least one protrusion in a direction upwards, and a subsequent layer over the base layer and the at least one protrusion so that the base layer anchors to the subsequent layer.

Figure 12:
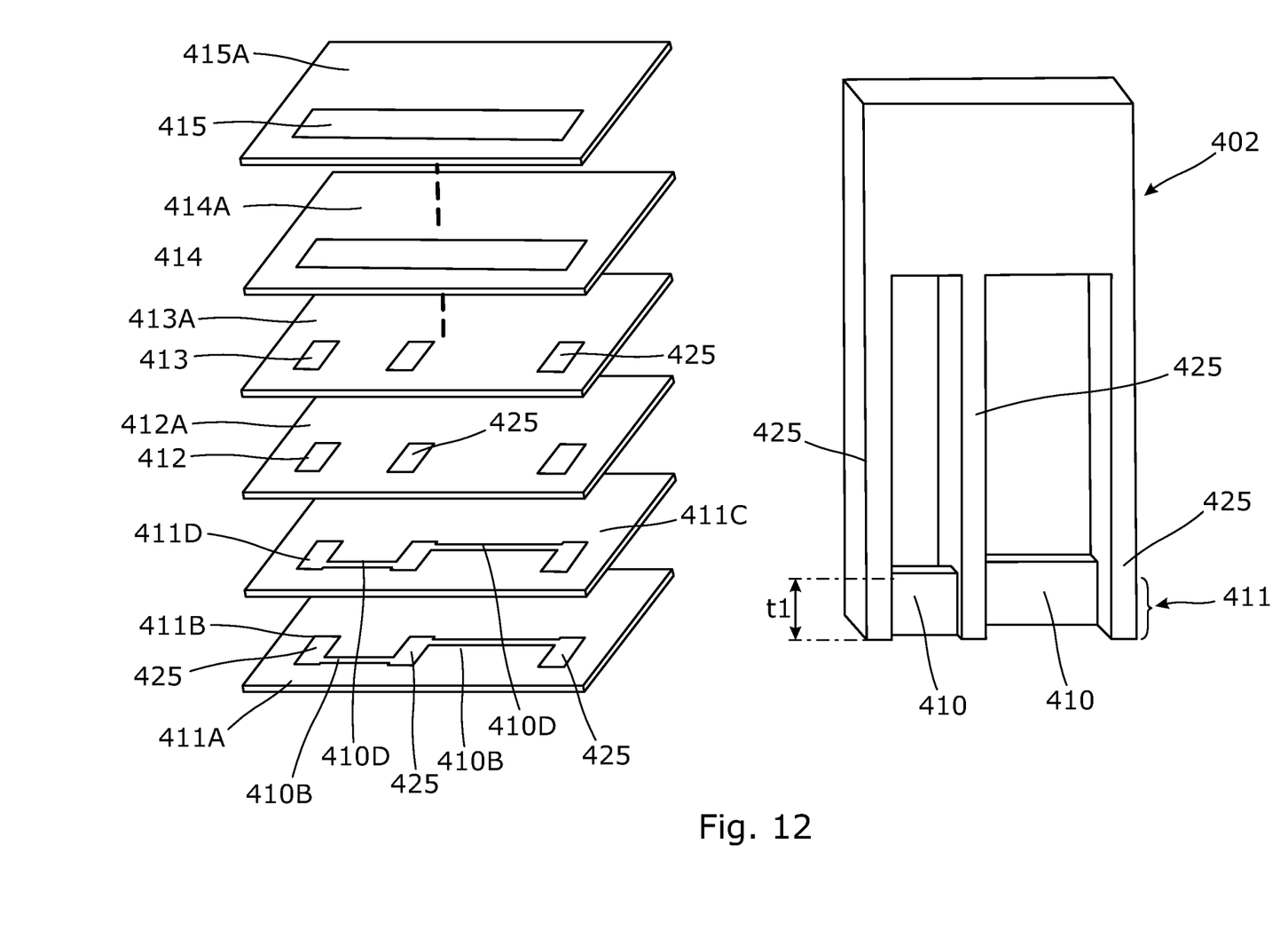
FIG. 12 illustrates a diagram of an example of how an object is printed layer by layer, and the resulting object.

FIG. 12 illustrates a diagram of printed layers 411B, 411D, 412-415 of an example printed object 402 (left-side) and the resulting object 402 (right-side). The left side of FIG. 12 illustrates six solidified layers 411B, 411D, 412-415 within corresponding layers of carrier medium 411A, 411C, 412A-415A. For example the layers 411B, 411D, 412-415 are solidified through chemical bonding, photo-polymerization or heating. For example the first two printed layers 411B, 411D (left-side) form the base layer 411 (right-side). For example the first two printed layers 411B, 411D and the resulting base layer 411 include protrusions 410B, 410D, 410, respectively, that are not present in the corresponding original model.

For example, a cross section of a portion of the original model consists of interrupted portions, such as separate leg or foot portions or otherwise originally protruding portions. For example, this portion with interrupted portions corresponds to what will be the base of the printed object 402. For example the original model can be derived from the right-side of FIG. 12 by deleting the protrusions 410 that were added. The base layer 411 includes originally interrupted layer portions 425 that are also present in the original model, and further includes added protrusions 410 connected to these interrupted layer portions 425. For example the protrusions 410 extend in horizontal direction, for example parallel to the platen. For example the protrusions 410 connect the originally interrupted portions 425 up to a thickness t1 of the base layer 411, whereas the originally interrupted portions 425 may span over a larger height. The subsequent layers 412, 413 may include interrupted portions without added protrusions 410, as can be seen from FIG. 11. For example the subsequent layers 412, 413, 414, 415 are the same as corresponding portions of the original model. In the illustration, a first and second subsequent layer 412, 413 consist of interrupted portions 425 without added protrusions 410 and a third and fourth subsequent layer 414, 415 consist of originally uninterrupted layers.

Figure 13:
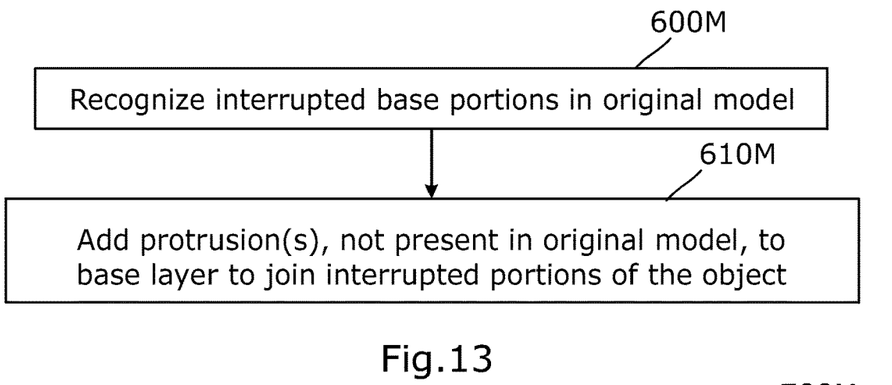
FIG. 13 illustrates a flow chart of an example of a method of preparing an object for printing, for example corresponding to FIG. 12.

FIG. 13 illustrates a flow chart of an example of a method of preparing an object for printing. For example, the method includes reading an original model that includes interrupted portions, such as separate legs or feet or original protrusions. For example the method includes recognizing a portion that corresponds to a base layer with originally interrupted portions (block 600M), and adding protrusions, that are not present in the original model, to the object's base layer to join interrupted portions of the base layer (block 610M). For example a computer-readable medium includes instructions that, when executed, causes a processor to determine if an original model includes such interrupted portions, and, if these are determined, add at least one protrusion to the object's base layer to connect the interrupted portions of the base layer.

Figure 14:
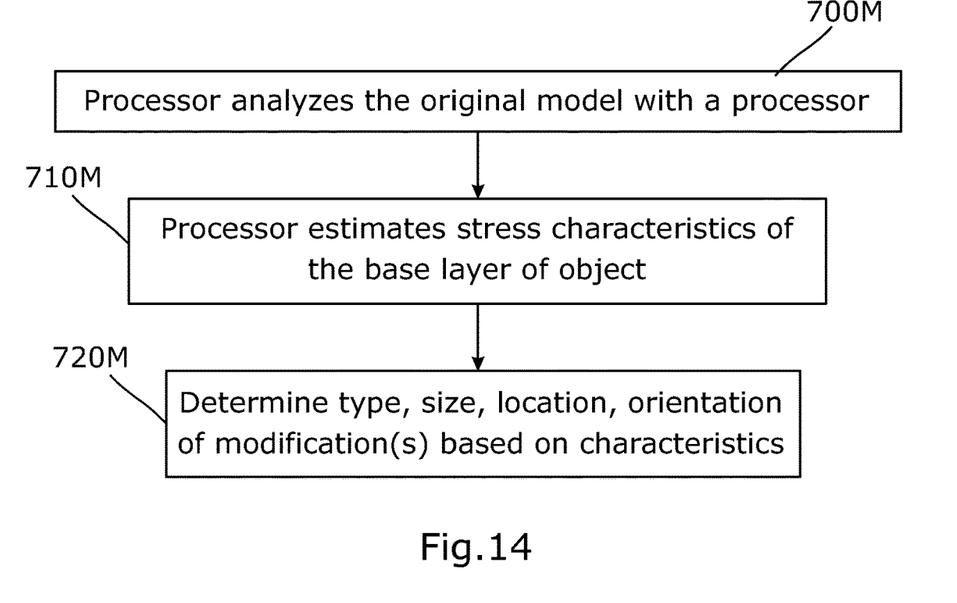
FIG. 14 illustrates a flow chart of again another example of a method of preparing an object for printing.

FIG. 14 illustrates a flow chart of another example of a method of processing an original model for printing. For example the method includes analyzing the original model with a processor (block 700M). For example the processor reads certain characteristics of a portion of the original model that corresponds to a base layer of the object. For example the method further includes that the processor determines stress characteristics and/or dimensional characteristics of the base layer of the to-be-printed object (block 710M). For example the stress characteristics can be calculated, for example through finite element analysis or the like, or can for example be retrieved from a look-up table (LUT). For example, the processor determines an eligible type, size, shape, location and/or orientation of the at least one modification based on the determined stress characteristics and/or dimensional characteristics of the original model (block 720M). For example a type of modification is determined that appears most suitable to reduce deformation in view of these characteristics. For example a suitable size, shape, location and/or orientation of the at least one protrusion can be derived from a LUT that may include said size, shape, location and/or orientation in relation to said determined stress and/or dimensional characteristics of the original model. In another example, finite element analysis can be performed to determine a suitable size, shape, location and/or orientation of the added protrusion 10. For example a computer readable medium includes instructions that, when executed, cause a processor to determine stress and/or dimensional characteristics of at least the base layer of the to be printed object, and determine on the basis of these stress and/or dimensional characteristics at least one of a type, size, shape, location and/or orientation of the at least one modification.

Figure 15:
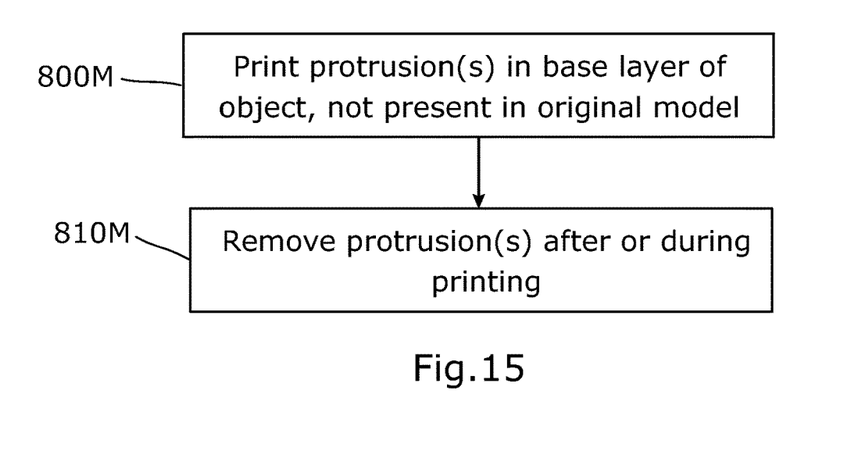
FIG. 15 illustrates a flow chart of an example of a method of printing.

FIG. 15 illustrates a flow chart of an example of a method of printing a tangible object. The method includes printing a base layer of the object with protrusions that are not present in the original model (block 800M). For example, the method further includes removing the at least one protrusion after printing at least part of the object (block 810M). In one example the protrusion is removed during printing. In one example the protrusion is removed after printing. In one example the protrusion is removed by an internal print system sub-system or manually. For example, the removing involves sanding, cutting, tearing or the like.

According to an aspect of this disclosure, a computer-readable medium 4, 4A is provided. The computer-readable medium 4, 4A stores a set of computer-readable instructions that, when executed, cause a processor 5, 5A to read an original model 3 of a to-be-printed three dimensional object 2, 2A, 102, 202, 302, 402 and modify a base layer 11, 11A, 111, 211, 311, 411 of the object 2, 2A, 102, 202, 302, 402 with respect to the original model 3. In one example the modification 10, 10A is or includes a protrusion 110, 210, 310, 410. According to another aspect of this disclosure, a method of preparing a three-dimensional object for printing is provided. The method includes (i) reading an original model 3, and (ii) modifying a base layer 11, 11A, 211, 311, 411 of the object 2, 2A, 102, 202, 302, 402 with respect to the original model 3. It should be understood that although in FIGS. 1, 5, 7, 8, 10A, 10B and 11 physical objects 2, 102, 202, 302, 402 are illustrated, the modification step can be a virtual processing step and the respective modification 10, 10A can be virtual, so that the physical object 2, 102, 202, 302, 402 including the modification 10, 110, 210, 310, 410 can be printed by a third party at another point in time.

According to yet another aspect of this disclosure a method of reducing deformation in a three dimensional object is provided, wherein the deformation is reduced by adding a protrusion 10, 10A, 110, 210, 310, 410 to a base layer 11, 11A, 211, 311, 411 of a virtual or printed object 2, 2A, 102, 202, 302, 402, wherein (i) the protrusion 10, 10A, 110, 210, 310, 410 is not present in the original model 3, and (ii) the base layer 11, 11A, 211, 311, 411 and protrusion 10, 10A, 110, 210, 310, 410 have a thickness t of approximately 500 micron or less, or one millimeter or less. According to another aspect of this disclosure a three dimensional print system 201 is provided, comprising a platen 207 for supporting an object 202 for printing, the platen 207 comprising a support surface 219, and an array of holes 220 in the support surface 219, to allow stress in first layers of a to-be-printed object 202 to propagate to protrusions 210 formed in the holes 220.

What is claimed is:

1. A non-transitory computer-readable medium having a set of computer-readable instructions that, when executed, cause a processor to:
   read an original model of a three dimensional object;
   define a base layer within the object of the original model by setting a thickness for the base layer of the object of the original model based on a thickness at which a corresponding base layer of a three dimensional object to be printed obtains sufficient rigidity to resist internal stress-induced deformation of the base layer of the object to be printed;
   modify data of the original model, the data of the original model being modified by adding data for a number of protrusions extending from the base layer of the object of the original model, the added data based on a propagation of stresses to be provided in the base layer of the object to be printed by a corresponding number of protrusions formed in the object to be printed according to the modified data, and the protrusions of the object to be printed configured to be formed integrally with the base layer of the object to be printed and from a same build material as the base layer of the object to be printed according to the modified data; and
   output the modified data for production of the to-be-printed three dimensional object, the three dimensional object being produced including the number of protrusions and the base layer corresponding to the number of protrusions and the base layer of the modified data, respectively.

2. The computer-readable medium of claim 1 wherein a protrusion of the number of protrusions extends from the base layer of the modified object data without contacting another portion of the modified object data and has a serpentine or curled shape.

3. The computer-readable medium of claim 1 wherein according to the modified data, a thickness of the base layer of the produced object is the same as that of the number protrusions of the produced object and is approximately 500 microns or less.

4. The computer-readable medium of claim 1 wherein the instructions, when executed, cause the processor to further modify the data so as to add data for a number of sub-protrusions extending from the number of protrusions being added.

5. The computer-readable medium of claim 1 wherein the instructions, when executed, cause the processor to add the number of protrusions oriented in a direction downwards with respect to the base layer of the object of the original model.

6. The computer-readable medium of claim 1 wherein the instructions, when executed, cause the processor to add:
the number of protrusions in a direction upwards with respect to the base layer of the object of the original model, and
a subsequent layer of the original model over both the base layer of the modified data and the number of upwardly extending protrusions of the modified data so that during the production of the object the number of corresponding upwardly extending protrusions of the object being produced anchor to a subsequent layer of the object being produced corresponding to the subsequent layer of the object of the original model.

7. The computer-readable medium of claim 1
wherein the instructions, when executed, further cause the processor, while modifying the data, to:
analyze the original model,
determine characteristics of at least the base layer of the object of the original model, and
determine a type, size, location, and orientation for the number of protrusions of the modified data based on the characteristics of the base layer of the object of the original model.

8. The computer-readable medium of claim 1 wherein the instructions, when executed, further cause the processor to:
when modifying the data, determine if a portion of the original model that corresponds to the base layer of the object of the original model comprises any interrupted portions, and,
if any of the interrupted portions are identified in the base layer of the object of the original model by said determining, add one of the protrusions to connect to different portions of the base layer of the object of the original model across respective ones of the interrupted portions.

9. The computer-readable medium of claim 1 wherein the instructions, when executed, cause a system to:
produce the to-be-printed three dimensional object at a position above a platen such that there is carrier medium between a bottom of the three dimensional object being produced and the platen,
wherein the number of protrusions of the object being produced extend downward toward the platen from the base layer of the three dimensional object being produced.

10. The computer-readable medium of claim 1 wherein one of the number of protrusions of the modified data extends horizontally and inwards with respect to the base layer of the modified data into a hollow portion of the object of the modified data.

11. The computer-readable medium of claim 1 wherein the protrusions of the modified data have a tubular shape.

12. A method of preparing a three-dimensional object using the non-transitory computer-readable medium of claim 1, the method comprising:
performing said reading,
defining, modifying, and outputting steps.

13. The method of claim 12 wherein the base layer of the object being produced comprises a first layer up to a thickness of 1 millimeter.

14. The method of claim 12 further comprising orienting the number of protrusions being added in a horizontal direction with respect to the base layer of the object of the original model.

15. The method of claim 12 further comprising orienting the number of protrusions being added upwards with respect to the base layer of the object of the original model, wherein corresponding upwardly oriented protrusions of the to-be-printed object are configured to anchor the base layer of the to-be-printed object to a subsequent layer of the to-be-printed object formed in accordance with a subsequent layer of the original model.

16. The method of claim 12 further comprising orienting the number of protrusions being added downwards with respect to the base layer of the object of the original model, wherein corresponding downwardly oriented protrusions of the to-be-printed object are configured to anchor the base layer of the to-be-printed object to an underlying platen.

17. The method of claim 12, further comprising:
determining if interrupted portions are present in the object of the original model, and
joining corresponding ones of interrupted portions of the object of the original model, if identified by said determining, by a corresponding one of the protrusions being added.

18. The method of claim 12 further comprising removing the number of protrusions from the produced object.

19. A three-dimensional print system comprising the non-transitory computer-readable medium of claim 1 and a platen for supporting the object to be printed, the platen comprising:
a support surface; and
an array of holes in the support surface, the array of holes configured to allow stress in first layers of the to-be-printed object to propagate to protrusions of the to-be-printed object corresponding to the protrusions of the modified data formed in the holes.

* * * * *